United States Patent [19]

Fischer

[11] Patent Number: 5,083,407
[45] Date of Patent: Jan. 28, 1992

[54] FIXING ELEMENT ANCHORABLE IN DRILLED HOLES HAVING AN UNDERCUT

[75] Inventor: Artur Fischer, Tumlingen, Fed. Rep. of Germany

[73] Assignee: Fischerwerke Artur Fisher GmbH & Co., KG, Waldachtal, Fed. Rep. of Germany

[21] Appl. No.: 644,450

[22] Filed: Jan. 23, 1991

[30] Foreign Application Priority Data

Feb. 26, 1990 [DE] Fed. Rep. of Germany ....... 4005999

[51] Int. Cl.⁵ ............................ E04B 1/38; F16B 13/06
[52] U.S. Cl. .......................................... 52/511; 52/704; 411/54
[58] Field of Search .................. 411/54, 55, 60, 61, 411/107, 109, 446, 447, 448, 456, 459, 77; 52/511, 704, 707

[56] References Cited

U.S. PATENT DOCUMENTS

| | | | |
|---|---|---|---|
| 726,070 | 4/1903 | Keen | 411/60 |
| 847,888 | 3/1907 | Birdsall | 411/459 |
| 3,172,329 | 3/1965 | Setzler | 411/54 |
| 3,965,794 | 6/1976 | Dorgnon | 411/54 |
| 4,560,311 | 12/1985 | Herb et al. | 411/54 |

FOREIGN PATENT DOCUMENTS

| | | | |
|---|---|---|---|
| 1074178 | 3/1954 | France | 411/77 |
| 1186263 | 2/1959 | France | 411/54 |

*Primary Examiner*—Neill R. Wilson
*Attorney, Agent, or Firm*—Michael J. Striker

[57] ABSTRACT

A fixing element for securing a facing panel to a masonry and anchorable in an undercut of a drilled hole formed in the facing panel, has an expansion member with an expander cone, formed at an end thereof and a shank portion extendable beyond the rear surface of the facing panel and projecting into the masonry. Holding elements is formed on the shank portion to reliably fix the shank portion in the masonry, and an expansible sleeve is displaceable over the expander cone for anchoring the fixing element in the undercut of the hole drilled in the facing panel.

1 Claim, 2 Drawing Sheets

FIXING ELEMENT ANCHORABLE IN DRILLED HOLES HAVING AN UNDERCUT

BACKGROUND OF THE INVENTION

The invention relates to a fixing element anchorable in an undercut of a drilled hole in facing panels and comprising an expansion member with an expander cone at one end thereof and a shank portion projecting beyond a facing panel into a masonry to which the facing panel is secured, and an expansible sleeve.

Fixing elements including an expansion member which, at its end that is inserted into a drilled hole, has a cone onto which an expansible sleeve can be pushed are known. As the expansible sleeve is pushed on, it expands and is therefore able to engage with a matching fit in an undercut of a particular drilled hole.

To fix facing panels, the expansion element also has a threaded portion projecting beyond the rear side of the facing panel, with which the facing panel can be fixed to a support construction mounted on masonry. A frequently encountered problem, however, is the task of applying the facing panel directly to the masonry in order to reconstruct or clad crumbling masonry. To fix and at the same time smooth out irregularities in the masonry caused by damage, the facing panel is placed onto a bed of mortar applied to the masonry. It is possible, however, for the mortar to become detached from the surface of the masonry by heavy rain, the effects of the weather and so on, so that the cladding of facing panels are destroyed as a result.

SUMMARY OF THE INVENTION

The object of the invention is a fixing element with which it is possible to fix facing panels reliably and directly to the masonry.

The object of the invention is achieved by providing on a shank portion of the expansion element that extends into masonry, special holding elements. After anchoring the fixing elements in an undercut of drilled holes formed in the rear side of the facing panel, the facing panel is secured by projecting shank portions of the expansion members to the masonry to be clad. To this end, cylindrical drilled holes are made in the masonry in accordance with the distribution of the fixing elements. After cleaning the outer surface of the masonry and applying a bed of mortar, during which the drilled holes in the masonry are also filled with mortar, the facing panel is pressed on, the shank portions penetrate into the mortar-filled drilled holes in the masonry and thereby produce a connection between the facing panel and the masonry. Once the mortar has hardened, the holding means arranged on the shank portions provides a lasting anchorage which is also protected against extreme environmental influences.

The holding elements are formed as part of the shank portion and can be in the form of projections, notches, circumferential grooves, corrugated indentations or similar configurations.

To facilitate the penetration of the shank portions into the mortar-filled drilled holes in the masonry, the shank portions are provided with a conical tip. This shaping also enables the position of the drilled holes to be made in the masonry to be marked as the facing panel is pressed against the masonry with the tips of the shank portions.

The present invention both as to its construction so to its mode of operation, together with additional objects and advantages thereof, will be best understood from the following detailed description of the preferred embodiment when read with reference to the accompanying drawings.

BRIEF DESCRIPTION OF THE DRAWINGS

The objects, features and advantages of the present invention will now be illustrated in more detail by the following detailed description, reference being made to the accompanying drawing in which.

DETAILED DESCRIPTION OF THE PREFERRED EMBODIMENT

Figure 1:
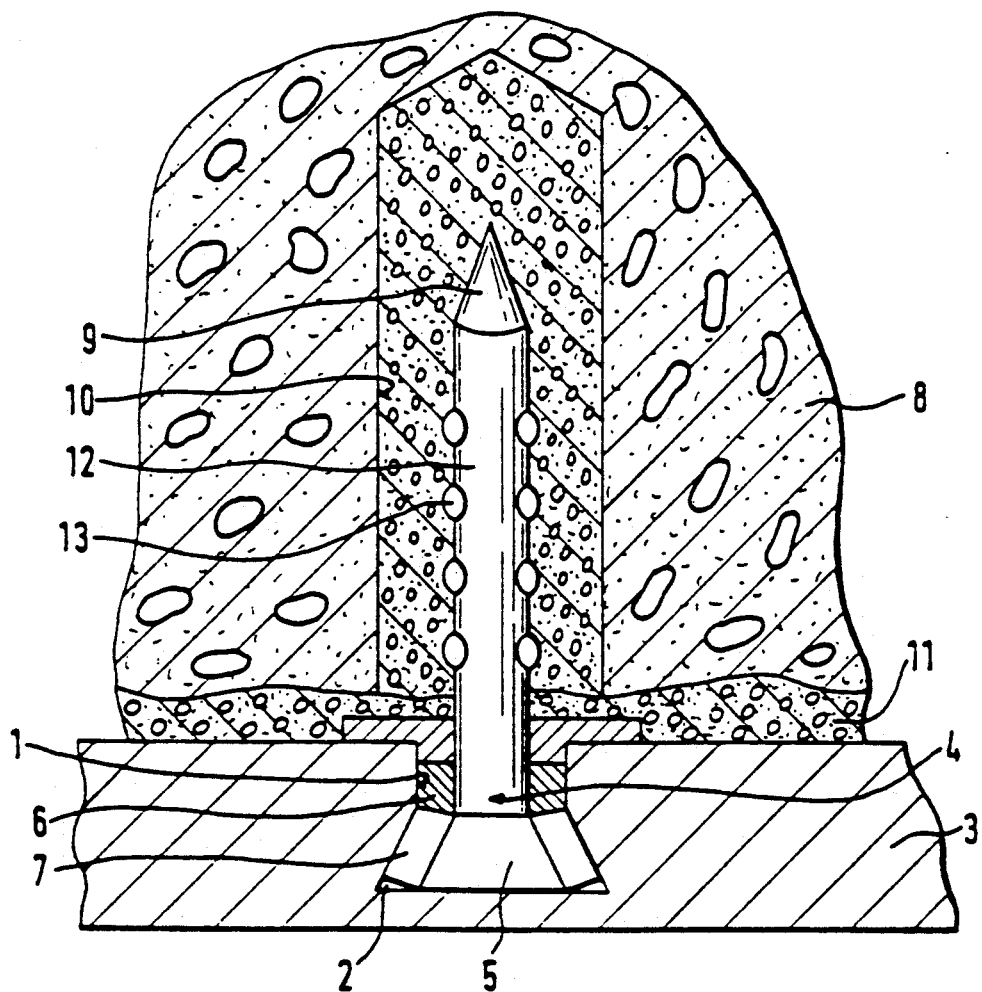
FIG. 1 is a cross-sectional view through a single fixing element anchoring a facing panel to masonry in a fixing arrangement according to the present invention.

The fixing element anchored in a hole 1 with an undercut 2 and drilled in a facing panel 3, comprises an expansion member 4 and an expansible sleeve 6 which can be driven onto the expander cone 5 of the expansion member 4. As the expansible sleeve 6 is driven on, its expansible leaves 7 are bent out into the undercut 2, and the expansion element 4 becomes fixed in the facing panel with a matching fit and virtually free from expansion pressure.

Figure 2:
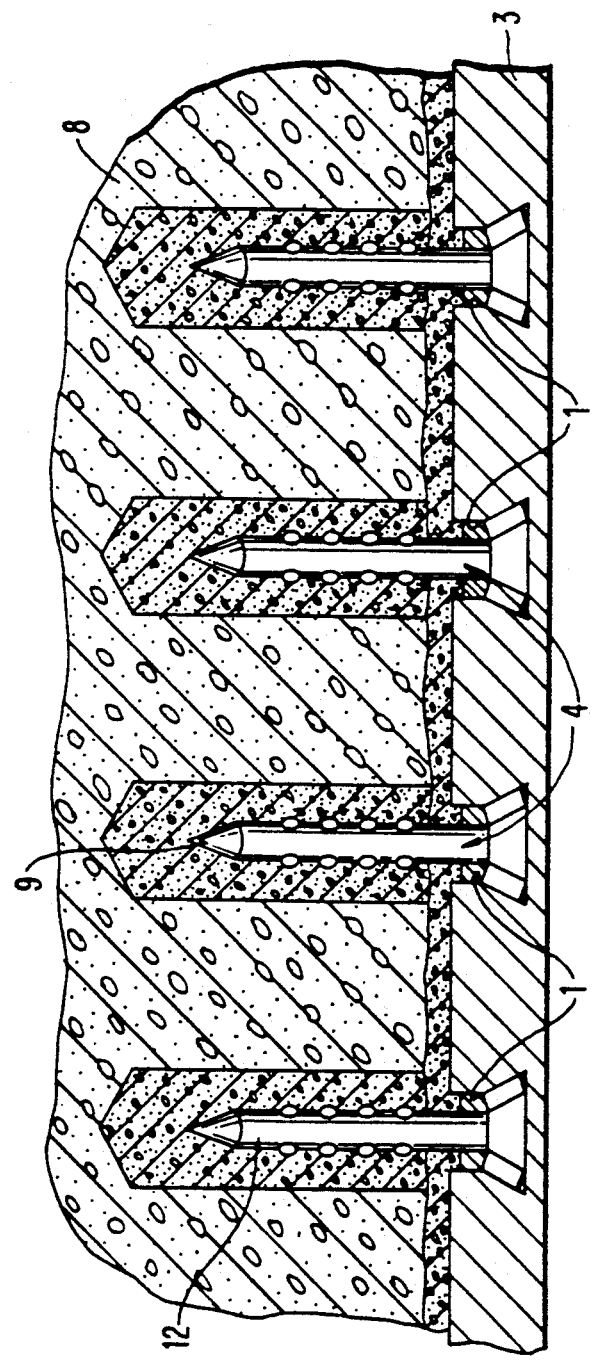
FIG. 2 is a cross sectional view through a fixing arrangement for anchoring a panel to masonry according to the invention showing a plurality of fixing elements, each anchored in an undercut of a drilled hole in a facing panel and also in a masonry portion in a drilled hole in the masonry.

The facing panel 3 is fixed to the masonry 8 with several expansion members 4 fixed in the drilled holes 1 as shown in FIG. 2 in this manner. With conical tips 9 formed on the projecting shank portions 12 of the expansion members 4, marks for the drilled holes 10 are made on the masonry to be clad with the facing panel. Once the drilled holes 10 have been made in the masonry, the outer face of the masonry is cleaned, and then a mortar bed 11 is applied to smooth the irregularities of the masonry surface. The drilled holes 10 are also filled with mortar at the same time.

To fix the facing panel 3, it is pressed onto the mortar bed 11 and, at the same time, the shank portions 12 of the expansion element 4 are pushed into the drilled holes 10 in the masonry 8. Once the mortar has hardened, in addition to the mortar bond, the holding elements 13 located on the shank portion 12 provide a lasting and reliably fixing of the facing panel 3 to the masonry.

While the invention has been illustrated and described with reference to a specific embodiment of a fixing element for fixing a facing panel to a masonry, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A fixing arrangement in combination with a facing panel provided with a plurality of drilled holes in a rear surface thereof, said fixing arrangement being structured for attachment of the facing panel to a masonry wall provided with a corresponding plurality of drilled holes whose positions correspond to positions of the drilled holes in the panel, when the panel is positioned against the masonry wall; said fixing arrangement comprising undercut wall surfaces on each of a plurality of undercuts provided in the drilled holes in the panel, a plurality of mortar portions located in the drilled holes of the masonry wall, and a plurality of fixing elements corresponding to said plurality of drilled holes of the facing panel, each of said fixing elements comprising an expansion member having at an end thereof an expander cone, said expander cone being structured for anchoring in one of said drilled holes in the panel with said expander cone in said undercut of said drilled hole, and a shank portion extending beyond the rear surface of the facing panel and projecting into the mortar portion of one of said drilled holes in said masonry wall, when said expander cone is positioned in one of said drilled holes of said panel, holding elements formed on said shank portion for reliably fixing said shank portion in the mortar portions in the masonry holes, said holding elements being selected from the group consisting of threads, projections, notches and corrugated indentations, and an expansible sleeve displaceable over said expander cone for anchoring said fixing element in said undercut of the facing panel.

* * * * *